Aug. 7, 1928.
M. CHARLES
1,680,204
HYDRAULIC BRAKING APPARATUS
Filed July 6, 1926
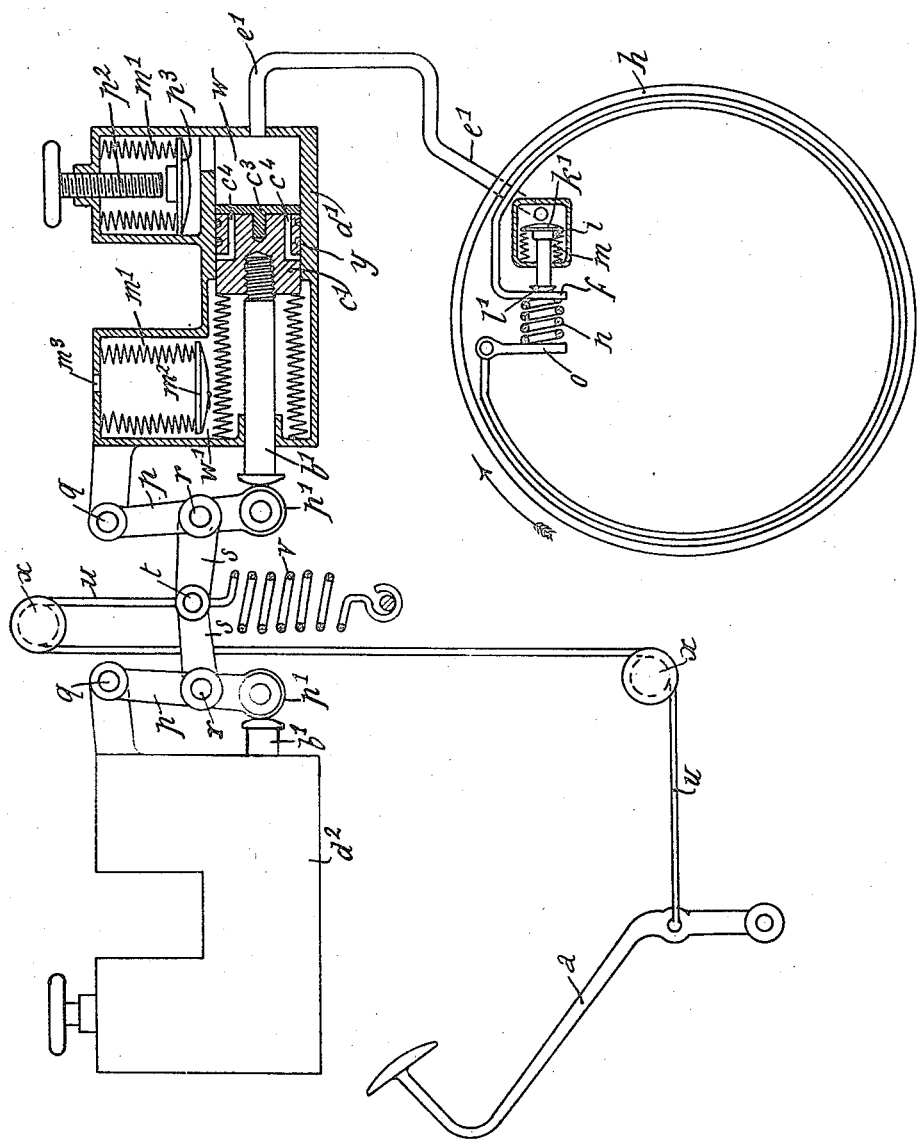
Inventor
Maurice Charles.
By Henry Orth Jr
Atty.

Patented Aug. 7, 1928.

1,680,204

UNITED STATES PATENT OFFICE.

MAURICE CHARLES, OF COURBEVOIE, FRANCE.

HYDRAULIC BRAKING APPARATUS.

Application filed July 6, 1926, Serial No. 120,728, and in France July 16, 1925.

The present invention relates to improvements in hydraulic braking apparatus, chiefly applicable to motor vehicles, and the apparatus comprises a power device and an actuated device connected together by suitable piping, the fluid tight operation being assured by the disposition, between the head of the piston and the corresponding end of the cylinder, of an expanding packing member of bellows shape which provides for the movement of the piston.

The present invention relates to improvements in the control of the brakes.

The first improvement consists in the fact that the brakes are thrown by the expansion of a suitably compressed spring, due to the pressure in the said actuated device and in the piping, the expansion being produced by the diminution of this pressure due to a displacement of the piston of the power device by means of suitable rod and link gear.

Under these conditions, the pressure of the fluid in the actuated device (or receiver) which regulates the degree of the braking, acts in reality as a counter-pressure for compressing the braking spring so that the braking is much less abrupt and is also much more accurate.

Another improvement consists in the arrangement of the said power device (or generator) so as to provide for the adjustment of the pressure which normally holds back the brakes. The said generator further comprises means for compensating the differences of pressure occuring in the inoperative position of the apparatus.

The following description, with reference to the accompanying drawings which by way of example, discloses the manner in which the invention is carried into effect. The single figure represents a diagrammatic assembly of the brake system with parts shown in section.

Within the brake drum is disposed the receiver $i$ in which is movable the piston $k^1$, a tight joint being formed between the piston and the corresponding end of the cylinder by the bellows $m$. Upon the end of the rod of piston $k^1$ is mounted the head $l^1$ which makes contact with the movable strip or jaw $f$ of the brake, against the action of a spring $n$ which bears against the fixed stop $o$. The end of the receiver $i$ is connected by the conduit $e^1$ with the generator $d^1$.

The said generator comprises the piston $c^1$, the end of whose rod $b^1$ makes contact with the end $p^1$ of a lever $p$ pivoted at the stationary point $q$; a certain point $r$ of the said lever is connected by the link $s$ with an axle $t$ secured to one end of a cable $u$ the other end of which is attached to the brake pedal $a$, after passing over the pulleys $x$. The spring $v$ tends to maintain the pedal in the raised position, and in this manner the entire braking system is maintained in the position represented in the figure.

The apparatus comprises a double braking system, in which I employ the generator $d^1$ and the receiver $i$, for the rear wheel braking or for like uses, and a second generator $d^2$ coacting with a receiver, not shown, which serves for the braking of the front wheels. Both generators $d^1$ $d^2$ are actuated by the common pedal $a$, by means of the single cable $u$. Attached to the two links $s$ which are so connected as to constitute a toggle for simultaneously actuating both levers $p$.

The operation of the braking system is as follows:

When the brake pedal $a$ is lowered, the pivoting axle $t$ is raised, whereby the lever $p$ rotates on the axles $q$ and displaces the piston of the generator towards the inner end $w^1$ of the cylinder, i. e. the piston $c^1$ is moved to the left.

The pressure of the fluid at the outer end $w$ of the generator, as well as in the conduit $e^1$ and in the receiver, will be reduced, so that the spring $n$ now preponderates, and the piston $k^1$ moves to the right and the brakes are applied by the spring $n$. Upon releasing the brake pedal, the spring $v$ brings the several parts into the initial position as shown in the figure, and the brakes are now disengaged.

To provide for the movement of the piston $c^1$ in the generator $d^1$, the latter comprises a movable end portion consisting of a disc $m^2$ provided with a sylphon or bellows $m^1$ whose internal part has an atmospheric connection through the aperture $m^3$.

Further, the adjustment of the pressure of the fluid in the generator as well as in the connecting conduit $e^1$ and in the receiver $i$ is assured by a movable end-piece $p^3$ whose position is regulated by the screw $p^2$, this being particularly important in the case of a lack of adjustment or wear of the brake.

While the piston is provided with packing $y$, liquid or fluid may flow from the end $w$ of the generator to the end $w^1$ during the periods in which the brake is inoperative so that a difference in pressure between the two ends may occur. To compensate for this difference in pressure I have provided at the end of the piston $c^1$ a check valve $c^3$ which will lift slightly from the end of the piston when the latter moves to the left, and which communicates through the conduits $c^4$ with the end $w^1$ when the said piston $c^1$ moves sufficiently to the left.

In these conditions, a small amount of fluid tends to return from the end $w^1$ into the end $w$, passing in the inverse direction through the conduits $c^4$, and then by way of the valve $c^3$, and this amount will depend upon the differences in the volume of the fluid.

Obviously, modifications may be made in the devices which have been above disclosed, without departing from the principle of the invention.

What I claim is:

1. A hydraulic braking system comprising in combination, a fluid responsive brake, means remote from said brake for supplying a fluid under pressure thereto to release said brake and a manually controlled toggle for releasing said pressure at will to permit the application of said brake.

2. A hydraulic braking system comprising, in combination, a fluid responsive brake, means remote from said brake for supplying a fluid under pressure thereto to release said brake, a manually controlled toggle for releasing said pressure at will to permit the application of the brake, and means for automatically returning said toggle to its initial position to restore said pressure when said toggle is released.

3. A hydraulic braking system comprising, in combination, a brake, means carried by said brake for moving it to an operative position, pressure responsive means opposing said first mentioned means, means including an incompressible fluid for supplying pressure to said second mentioned means, and manually controlled means for releasing said pressure to permit the application of the brakes.

4. A hydraulic braking system comprising, in combination, a brake, a spring carried by said brake for moving it to an operative position, pressure responsive means including an incompressible fluid for supplying pressure to said means, and manually controlled means for releasing said pressure to permit the application of the brakes.

5. A hydraulic braking system comprising, in combination, a brake drum, a brake disposed within said brake drum, a spring carried by said brake for moving it into engagement with the inner periphery of said drum, a piston pump receiver opposing the action of said spring, a piston pump generator, a conduit interconnecting said generator and said receiver, an incompressible fluid in said conduit, fluid tight bellows disposed in said generator and receiver, a toggle associated with the piston in said generator, a brake pedal for operating said toggle, and a spring adapted to oppose the movement of said toggle.

6. A hydraulic braking system comprising, in combination, a brake, means carried by said brake for moving it to an operative position, pressure responsive means opposing said first mentioned means, means including an incompressible fluid for supplying pressure to said second mentioned means, manually controlled means for releasing said pressure, and means for regulating the pressure developed in said incompressible fluid.

7. A hydraulic braking system comprising, in combination, a brake, a piston pump receiver associated with said brake, a piston pump generator for supplying pressure to said receiver, an incompressible fluid in said generator and receiver, fluid tight bellows disposed in said generator and receiver, means responsive to a drop in the pressure of said fluid for setting said brake, and means carried by the piston of said generator for compensating for differences in pressure developed in said generator during aspiration of said fluid therein.

8. In a hydraulic braking system, a piston pump receiver, a piston pump generator, a conduit connecting said generator and receiver, an incompressible fluid in said generator and receiver, fluid-tight bellows disposed in said generator and receiver, a chamber provided in said generator remote from said conduit, an outlet in said chamber opening into the atmosphere, and a hollow fluid-tight sylphon covering said outlet and extending into said chamber.

9. In a hydraulic braking system, a piston pump receiver, a piston pump generator, a conduit connecting said generator and receiver, an incompressible fluid in said generator and receiver, fluid-tight bellows disposed in said generator and receiver, a chamber provided in said generator adjacent said conduit, a hollow fluid-tight sylphon projecting into said chamber, an adjusting screw carried by said chamber and projecting into the interior of said sylphon to serve as an adjustable stop therefor, and braking means responsive to a reduction in pressure associated with said receiver.

In testimony that I claim the foregoing as my invention, I have signed my name hereto.

MAURICE CHARLES.